Patented Feb. 22, 1938

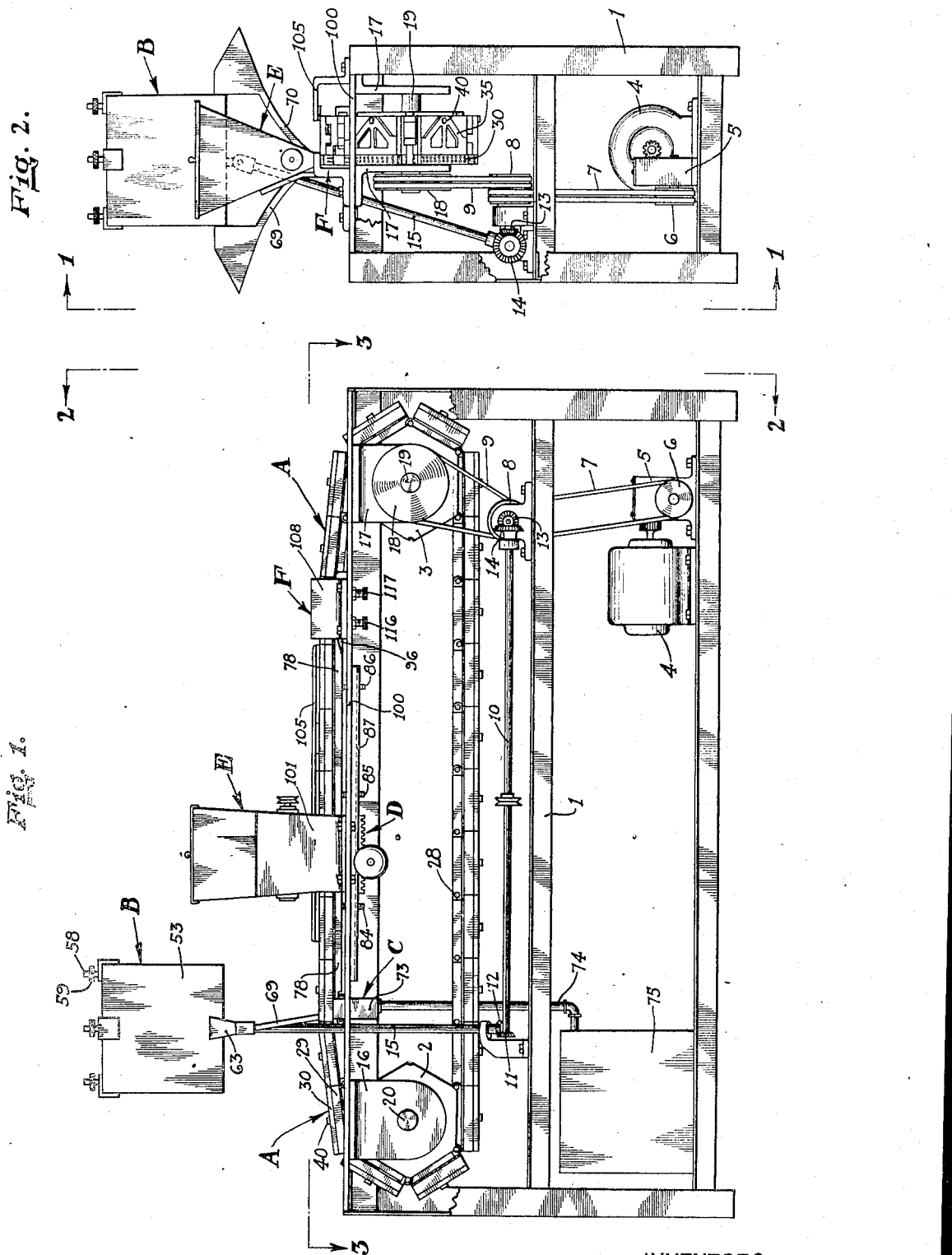

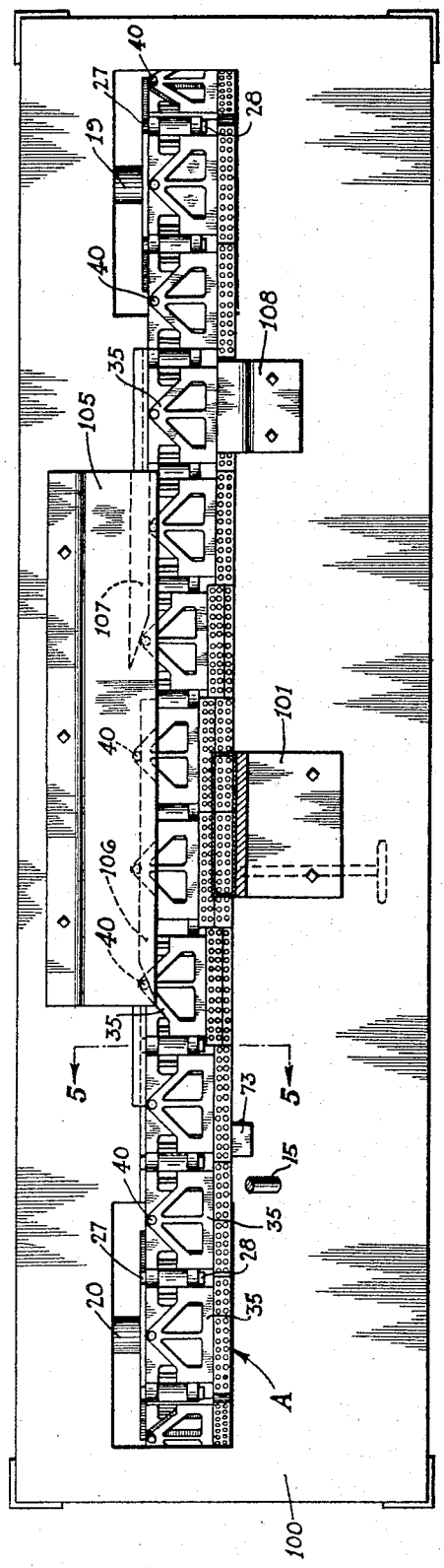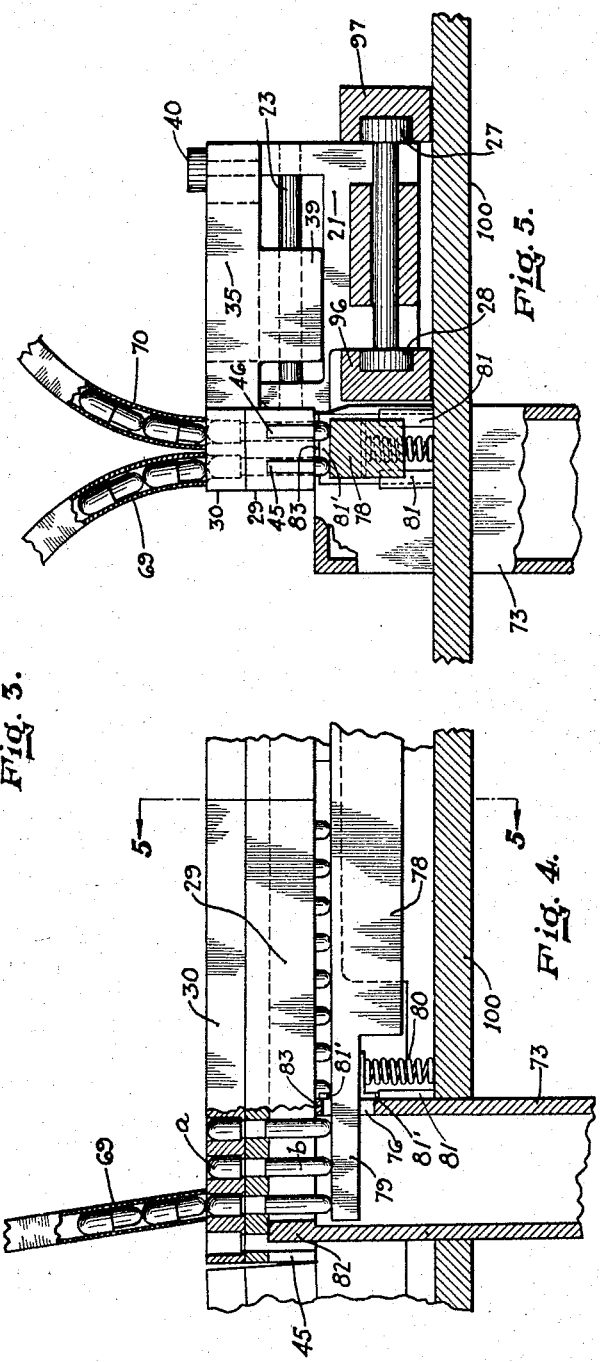

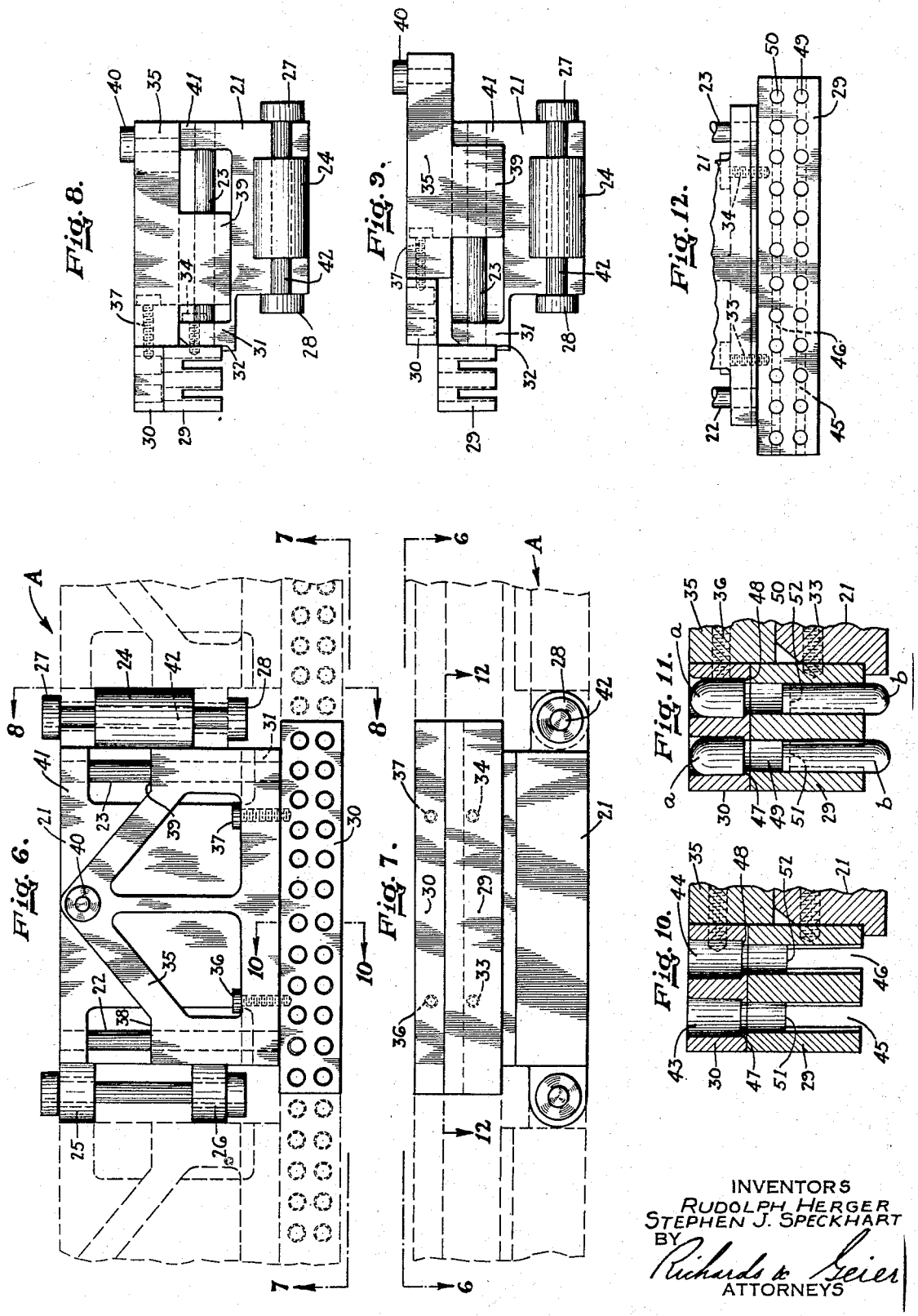

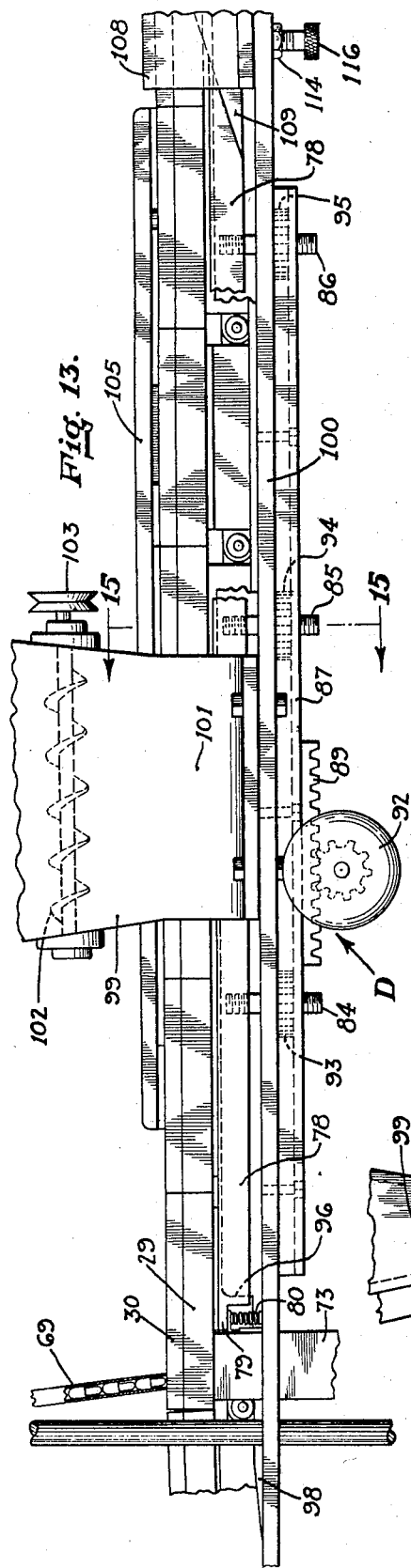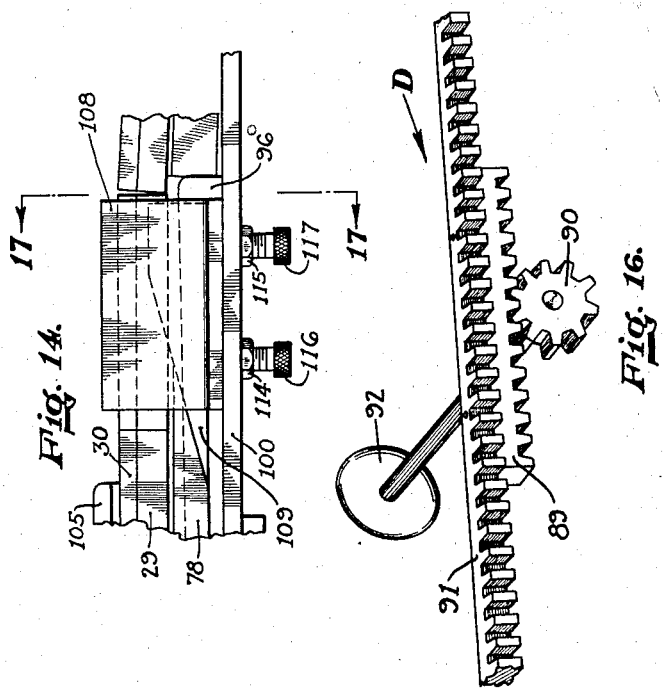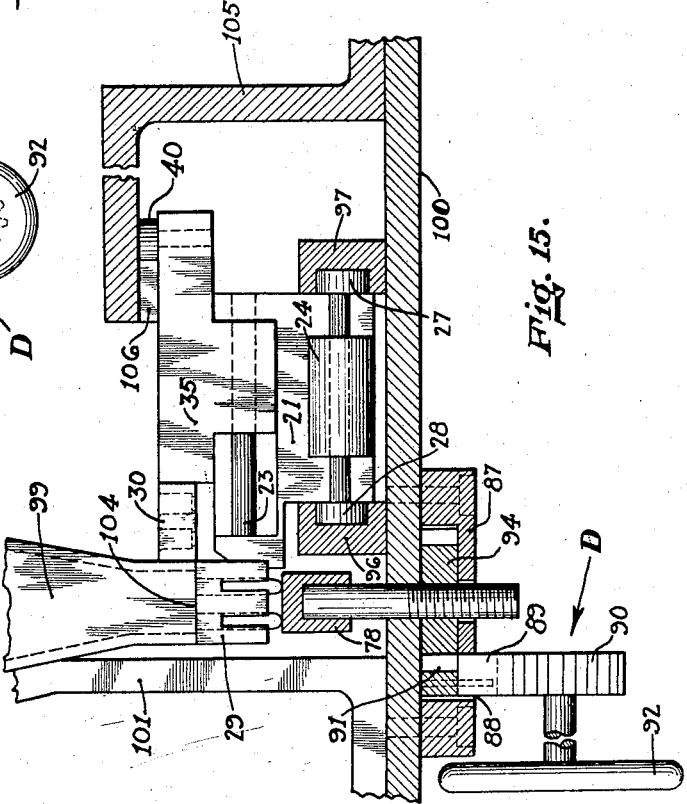

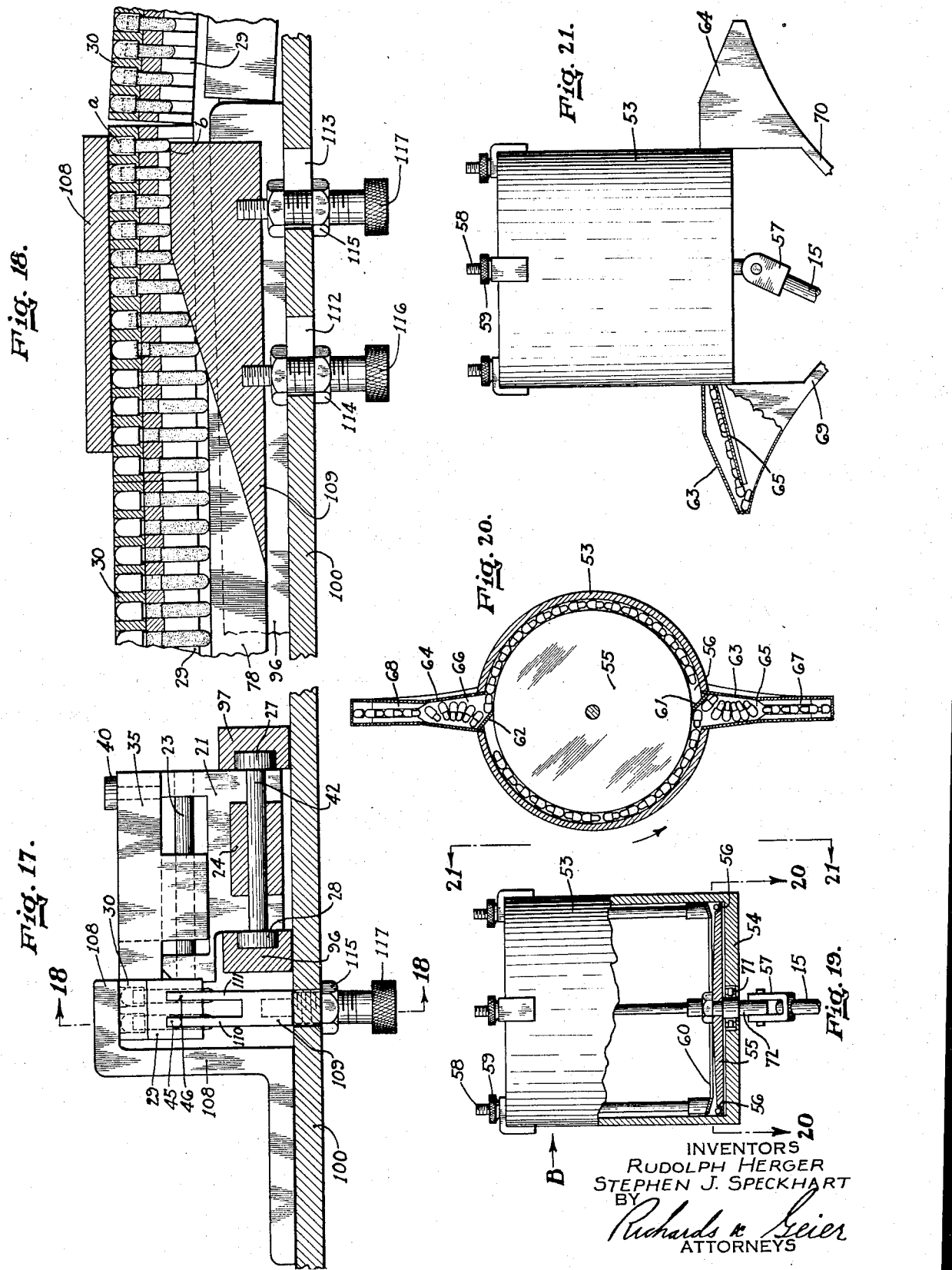

2,108,906

UNITED STATES PATENT OFFICE 2,108,906

CAPSULE FILLING MACHINE

Stephen J. Speckhart, Maplewood, and Rudolph Herger, Irvington, N. J.

Application July 21, 1937, Serial No. 154,744

14 Claims. (Cl. 226—41)

It is an object of our invention to construct a capsule filling machine which is completely automatic in its operations and functions, from the step where an empty capsule is presented to the machine, to the step where said capsule is closed with a predetermined amount of selected substance therein.

Another object of our invention is to provide a novel hopper and chute construction whereby capsules which have been promiscuously charged into the hopper, are guided into a chute structure which they leave in a definite position for presentation to a receiving conveyor.

It is a further object of our invention to provide means for automatically separating the two portions which comprise a capsule, so that the same are in condition to receive the powder, drug or whatever ingredient it is desired to put into the capsule.

A further object of our invention is the provision of means for accurately controlling the amount of powder, drug or ingredient that goes into the capsule.

After the capsule has received the powder, drug or desired ingredient, it is a further object of our invention to cap together the separated portions of the capsule with the substance contained therein, so that it is ready for commercial packing and distribution.

All of the above named objects and functions are accomplished automatically by means of our invention, a preferred embodiment of which is herein shown in the accompanying drawings, in which:

Fig. 1 is a front elevational view of the complete machine taken in the direction of arrows 1—1 in Fig. 2.

Fig. 2 is a side elevational view of Fig. 1, taken in the direction of arrows 2—2 in Fig. 1.

Fig. 3 is a sectional plan view taken through the plane 3—3 in Fig. 1.

Fig. 4 is a fragmentary elevational view partly in section, of the chute, the conveyor and the capsule separating means.

Fig. 5 is a side view taken through the plane 5—5 of Fig. 4.

Fig. 6 is a plan view of a conveyor flight and its associated die in the direction of arrows 6—6 in Fig. 7, showing its association with contiguous flights and dies.

Fig. 7 is a front elevational view taken in the direction of arrows 7—7 in Fig. 6.

Fig. 8 is a side elevational view taken in the direction of arrows 8—8 in Fig. 6.

Fig. 9 is a view similar to that of Fig. 8, except that the dies are cammed to a position out of alignment.

Fig. 10 is a sectional view taken through the plane 10—10 of Fig. 6.

Fig. 11 is a sectional view similar to that shown in Fig. 10; said view illustrating the position of separated capsules therein.

Fig. 12 is a plan view of the lower die taken along the plane 12—12 of Fig. 7.

Fig. 13 is an enlarged front elevational view of my machine, showing the table and the powder hopper.

Fig. 14 is a fragmentary front elevational view showing the cam housing for capping together the separated portions of the capsule.

Fig. 15 is a sectional view taken through the plane 15—15 of Fig. 13.

Fig. 16 is a perspective view of rack and pinion adjusting mechanism.

Fig. 17 is a sectional view taken through the plane 17—17 of Fig. 14.

Fig. 18 is a sectional view taken through the plane 18—18 of Fig. 17.

Fig. 19 is an elevational view partly in section, of the capsule hopper.

Fig. 20 is a sectional view of the hopper taken through the plane 20—20 of Fig. 19.

Fig. 21 is an elevational view of the hopper showing the chute constructions associated therewith.

In carrying out our invention it is our problem to take conventional empty capsules (shown in Fig. 20), separate the individual portions of these capsules, insert medicinal powder or ingredient therein, in a predetermined amount, and then bring together the two individual portions of the capsule. These functions must all be done automatically, and we accomplish the same by means of our machine, which as shown in Figs. 1 and 2, comprises a frame structure 1, for supporting a table 100.

The table 100, is provided with guide supports for an endless conveyor A. The conveyor is driven by sprocket wheels 2 and 3, said wheels being supported by shafts 20 and 19 in the respective hangers 16 and 17. An electric motor 4, through a conventional gear and worm drive 5, drives the pulley 6. The pulley 6 is associated with the pulley 8 by means of a drive belt 7. The pulley 8 is adapted to drive the pulley 18 by means of the drive belt 9. The pulley 18 is fixed to the shaft 19 and the latter in turn is fixed to the sprocket wheel 3, so as to provide a direct and continuous drive for the endless conveyor A. The puley 8 is mounted on a shaft which has associated with it the bevel gears 13, 14 for driving the shaft 10. The shaft 10 by means of bevel gears 11, 12, drives the substantially vertical shaft 15 which is associated with the capsule hopper B. The capsule hopper B is constructed to feed empty capsules to the endless conveyor A. Suction housing C separates the two portions of the capsules after they are fed to the endless conveyor. The amount of separation of these capsules is controlled by an adjusting mechanism, generally indicated by D. A supply hopper E, containing powder or some other selected ingredient, supplies a predetermined amount of the powder to the separated capsules. Cam closing mechanism F brings the separated portions of the filled capsules together as unitary members.

As shown in Figs. 3 and 6, the endless conveyor A consists of a series of associated flights, comprising upper members 35 and lower members 21 (Figs. 8 and 9). As shown in Figs. 6 to 9, the upper portion 35 of the flight has attached along one of its edges a die member 30. Threaded bolts 36 and 37 attach die member 30 to the upper flight member 35. As shown in Fig. 6, the upper flight member 35 is substantially triangular in shape, has an open frame work, and also has pivoted at its apex a roller 40. The ends of the flight member 35 have downwardly extending ears 38, 39 which are recessed so as to ride upon the pins 22, 23 of the lower flight member 21. As shown in Figs. 8 and 9, this constructional arrangement permits the upper flight member 35 to move transversely of the lower flight member 21, and of the path of travel of the endless conveyor A. The lower flight member 21 on the other hand has the abutments 31 and 41 to which are fixedly attached the crosspins 22, 23. The one side of the lower flight member 21 is cut away so as to provide a seat 32 for a lower die member 29. The die member 29 is fixedly attached to the lower flight member 21 by means of threaded bolts 33 and 34 (Fig. 12).

As shown in Fig. 6, the right-hand end of the lower flight member 21 has a lug 24, whereas the left-hand end of said flight member 21 has a pair of ears 25 and 26. Adjacent flights are similarly constructed so that corresponding lugs and ears are in direct alignment. As indicated by the dotted line construction of Figs. 6 and 7, these lugs and ears are apertured to receive a connecting pin, such as 42. In this way, adjacent flights are interconnected into an endless chain construction. The connecting pins 42 have attached at their outer ends, a pair of rollers 27 and 28. These rollers are adapted to ride in channel guide member 97 and 96 respectively, said channel guide members being mounted upon a horizontal table 100, as clearly shown in Figs. 5, 15, and 17.

In the sectional views of Figs. 10 and 11, it will be seen that the lower and upper dies 29 and 30 are adapted in one position to be in direct alignment. The upper die 30, in this particular instance, comprises twenty-four through openings, indicated by the numerals 43 and 44. These openings have a shoulder at their lower ends as indicated by the numerals 47 and 48. The lower guide 29 has a corresponding number of through openings 49 and 50, which are of the same diameter as the openings in die 30, from the shoulders 47 and 48 down. Furthermore, in the lower die 29 complete longitudinal cuts 45 and 46 are made through the die so as to pass through all of the openings of the lower die. These longitudinal cuts are indicated in dottd lines by numerals 45 and 46 in Fig. 12. It should be noted that these cuts extend from the bottom of the die 29 upwardly and stop at the plane indicated by the characters 51, 52. The construction of the dies 29 and 30 having the seats 47 and 48 is obviously made to permit separation of the two portions a and b of the capsules. The portions a seat upon the shoulders 47 and 48 when the portions b are pulled away from the portions a.

Figs. 19, 20, and 21 show the particular construction of the hopper whereby the capsules after having been promiscuously charged therein are constrained to be fed therefrom one by one in a definite direction. The hopper 53 (indicated generally in Fig. 1 by B), is cylindrical in shape, open at its top, and has a flat bottom 54. Mounted in the bottom of hopper for rotation, is a tapered disc 55. As noted in Fig. 19, this disc is thicker at its center where it is mounted upon the shaft 72, than at its outer circumference. The outer periphery of this disc 55 is stepped or grooved so as to receive the capsules therein, as shown in Figs. 19 and 20. Mounted above the tapered disc 55 is an annular ring 60. This ring 60 is adjustable by means of the supporting rods 58, which are threaded at their upper end and may be adjusted to such a position that the distance between the lower inner edge of the ring 60 and the adjacent upper surface of the disc 55 is just a little more than the width of the capsule being used. Thus, capsules lighting upon the rotary disc 55 will be permitted to slide beneath the annular ring 60, to the outer circumference of the disc 55 into the groove 56. This bar 60 prevents jamming up of the capsules in that space directly adjacent the groove 56. If larger capsules are to be used, then obviously the annular bar 60 would have to be raised to permit passage of said capsules therebeneath.

Assume that the receptacle 53 is promiscuously filled with capsules and that the rotary disc 55 is being driven by the shaft 15, through the universal connection 57 and the shaft 72 which is mounted by means of a ball bearing 71. As the disc 55 is rotating, the capsules have a tendency, due to centrifugal force and the inclination of the disc 55, to work themselves to the edge of said disc beneath the annular ring 60 and into the groove 56.

Provision is made to remove the capsules which drop into the groove 56. The construction for such removal is indicated in Figs. 20 and 21. On opposite sides of the receptacle 53, are located housings 63 and 64 for the skids and chutes 65, 69 and 66, 70 respectively. In Fig. 20, assuming that the disc 55 is rotating in the direction of the arrows shown, the capsules located in the groove 56 will be cammed out of the groove into the housings 63, 64 by the biased plates 61, 62. It will be noted in Fig. 20 that no matter what the position of the capsule is in its groove 56, it will have a tendency to swing about on the skids 65 or 66, so that the head of the capsule which is wider, will always swing downwardly, head first, as indicated in Fig. 20. The capsules ride on guides 67 and 68 head first, and as shown in Fig. 21, they slide off the skid 65, engaging the end wall of the housing 63. Said capsules pivot around their headed end and then slide down the chute 69, their narrower end first. The same operation takes place in the housing 64, the capsules therein being fed narrow end first down the spout 70. The two spouts 69 and 70 converge toward each other to a position directly above the upper dies 30 of the top flights of the conveyor A as shown in Figs. 1, 4, and 5.

In Fig. 1, as the flights of the conveyor leave the sprocket wheel 2, the dies associated therewith are empty, and move beneath the spouts 69 and 70. This latter position is shown in Fig. 5, and it will be noted that at this time, the lower die 29 and the upper die 30 are in direct alignment and that the openings of said dies automatically receive capsules from the spouts 69 and 70.

It will be noted from Figs. 4 and 5, that a housing 73 is constructed so as to encompass the space in the lower die which has just received a capsule. This housing 73 has a wall 82 which extends up into the grooves 45 and 46. The opposite wall of the housing 73 is shaped at 83, to fill the space between capsules leaving the suction chamber 73, but at the same time permit capsules to pass out of chamber 73. The housing 73 is thus completely sealed with respect to the lower die 29 and the capsules contained therein. As shown in Fig. 1, a housing 73 is in actuality a reservoir in which is maintained a vacuum. This vacuum is derived by means of a conventional vacuum pump and assembly, generally indicated by the numeral 75. A pipe connection 74 is associated with the vacuum pump assembly 75 and the vacuum reservoir 73. It will be obvious that as capsules drop from the spout 69 into the dies 30, 29, of Fig. 4, the lower portion of the capsule b is pulled away from the upper portion a of the capsule, by means of the suction contained within the container 73 acting upon the lower portion b of the capsule. The upper portions a of the capsules are prevented from being drawn down through the recessed dies 30 by means of their location upon the seats 47, 48, as indicated in Figs. 10 and 11. To prevent the lower portions b, of the capsules from being drawn down into the vacuum chamber 73, an adjustable supporting rod 78 has a portion 79 extending into the chamber 73. A slot 76 in the housing 73 permits the bar 79 to be adjusted vertically in said housing. A plate 81' seals the slot 76', and is adapted to ride in the guides 81. This sealing prevents the entrance of atmospherical pressure into the chamber 73 through the slot 76. It will be noted that the top of plate 81' (Fig. 5) is shaped to fit the contour of the bottom of the capsules. Note that the position of the bar 79 will determine the distance that the lower portion b, of the capsule, is separated from the upper portion a of the capsule. This regulation of the separation of the portions of the capsules will determine the amount of the powder or other substance which goes into the capsule, as will hereafter be made clear.

The adjustment of this bar 78, 79 is brought about by means of mechanism indicated broadly by the character D, in Fig. 1, and shown more specifically in Figs. 13, 15, and 16. From these figures it will be seen that the bottom of the table 100 has a housing 87. This housing 87 is slotted at 88 to receive a reciprocating rack 89. This rack 89 has downwardly facing teeth as shown in Fig. 16. The upper portion of the rack 89 is attached by rivets or any other fastening means to a second horizontal rack 91. This second rack has inwardly facing horizontal teeth as shown in Fig. 16. Rack 91 engages with gears 93, 94, and 95. Horizontal reciprocation of the rack 91 will rotate these various gears 93, 94, and 95. As shown in Fig. 15, the gear 94 engages the threaded end of a bolt or stud, said bolt or stud being attached to the adjusting bar 78. The gears 93, and 95 are similarly associated with the bar 78, with the result that upon actuation of the rack 91, all of the gears 93, 94, and 95 are rotated and the adjusting bar 78 is lifted or lowered uniformly as desired. The rack 91 is actuated by means of the rotation of a hand-wheel 92 which in turn rotates a pinion 90, which is in engagement with the rack 89. Reciprocation of the rack 89 results in a reciprocation of the rack 91.

After the capsules emerge with the dies from the suction chamber 73, the lower portion b of the capsule rides along the adjusting bar 78, as shown in Fig. 4. As shown in Fig. 3, as the flights approach the over-hanging cam 105, the roller 40 of the top flight 35, engages a cam surface 106 as shown in dotted lines in Fig. 3. This camming engagement effects a transverse movement of the upper flight 35 inwardly, with the result that the upper die 30 is moved completely out of alignment with respect to the lower die 29, as shown in Fig. 15. This position of the dies remains as they pass by the hopper 99. The lower portion of the hopper 99 is in direct engagement with the upper surface of the lower die 29, as indicated by the reference character 104 in Fig. 15. The result is that the substance in hopper 19 feeds into the openings of the lower die 29, as the latter passes thereunder. The hopper 99 is supported by a standard 101. When a lower die has passed the powder hopper, the upper flight 35 engages a second overhanging cam 107 (Fig. 3). This second cam 107 moves the upper flight 35 transversely, so that the two dies 29 and 30 are again brought into direct alignment. With the dies in this position, it is apparent that the openings and the lower portions b of the capsules in the lower die 29 are filled with the powdered substance, whereas the upper portion a of the capsules are empty, and located directly thereabove.

The next obvious function is to push the lower portions b with the powdered substance into engagement with their corresponding upper portions a, so as to form completed capsules. This latter function is obtained by means of the structure which we have designated generally by the character F, in Fig. 1. As shown in Figs. 14, 17, and 18, as the capsules ride along the adjustment bar 78, they enter an overhanging housing 108. Beneath the housing 108 is a camming surface 109. As shown in Fig. 17, the surface 109 has two upstanding portions 110 and 111 which project into the longitudinal spaces 45 and 46 of the lower die 29. Consequently, as the lower portions b of the capsules ride on the inclined surfaces 110, 111, they are gradually lifted upwardly, and the upper ends of the portions of the capsules b are forced into the head portions a of the capsules. The overhanging surface 108 of Fig. 18 prevents the portions a of the capsules from moving upwardly when the portions b are forced into the portions a. Provision is made for adjusting the camming surface 109 both vertically and longitudinally. Threaded members for supporting the camming surface 109 are actuated by the serrated knobs 116, 117. When a determined vertical adjustment is made for the camming member 109, such adjustment is fixed by means of the nuts 114, 115. Provision is also made for a longitudinal adjustment of the camming member 109 by means of slots 112 and 113 in the surface of the table 100. It is thus apparent that as the capsules emerge from the housing 108, the portions a and b have become assembled and enclose the desired amount of powder substance therein.

As the flights of the conveyor A pass the housing F and engage about the sprocket 3, the flights of the conveyor A then go into the lower horizontal run of the conveyor. Since the dies have now been inverted with the head a of the capsules facing downwardly, they will drop by gravity from out of their dies. An appropriate vessel can be provided to catch the capsules which have thus been removed. Upon a removal of all of the assembled capsules from their dies, the empty dies follow about the sprocket wheel 2, and again approach the spouts 69 and 70, to receive empty capsules. From that point on, the operation is repeated.

From the above it will be apparent that we have provided mechanism wherein empty capsules are fed to the dies of a continuously moving conveyor; a suction means is then provided to separate the upper and lower portions of the capsules. Special provision is made to control the elevation of the lower portion of the capsule so as to regulate the amount of powder substance which will be fed therein. We then provide a powder hopper, whereby the powder substance fills the lower portions of the capsules as the dies pass the powder hopper. Provision is then made to bring the upper and lower portions of the capsules together, forcing one into the other, so that a completely assembled capsule, with material therein is effected. It is apparent also, that these various functions are accomplished by our machine in a manner which is completely automatic, and requires no manual operation whatever, other than the supply of empty capsules to receptacle B, and the supply of powdered substance to the hopper E.

Various changes can be made over the exact construction of our preferred embodiment, without departing from the spirit of the invention, the scope of which is covered by the following claims:

We claim:

1. In a capsule filling machine, the combination of a power driven conveyor comprising a series of lower flight members being interconnected into an endless chain, each lower flight member having positioned thereon an upper flight member which is adapted to be moved transversely thereof, an upper die attached to the upper flight member and a lower die attached to the lower flight member, said dies being normally in superimposed alignment, a receptacle for promiscuously receiving empty assembled capsules and segregating them into columns whereby they may be fed to the superimposed dies of the endless conveyor, means for separating the two portions of the assembled capsules when in the dies, a hopper for feeding a powdered substance into the lower separated portions of the capsules, and means for lifting the filled lower portions of the capsules into engagement with the corresponding upper portions of the capsules so as to effect complete capsules having predetermined amounts of powdered substance therein.

2. In a capsule filling machine, the combination of a power driven conveyor comprising a series of lower flight members being interconnected into an endless chain, each lower flight member having positioned thereon an upper flight member which is adapted to be moved transversely thereof, an upper die attached to the upper flight member and a lower die attached to the lower flight member, said dies being normally in superimposed alignment, a receptacle for promiscuously receiving empty assembled capsules and segregating them into columns whereby they may be fed to the superimposed dies of the endless conveyor, means for separating the two portions of the assembled capsules within the dies, means for moving the upper die transversely of the lower die so as to present the lower die with its separated capsule portion unobstructed by the upper die, a hopper in engagement with the upper surface of the lower die for feeding powdered material therein as the conveyor passes thereunder, means subsequently bringing the upper and lower dies into direct alignment, and means for lifting the filled lower portions of the capsules into engagement with the corresponding upper portions of the capsules so as to effect complete capsules having predetermined amounts of powdered substance therein.

3. In a capsule filling machine, the combination of a power driven conveyor comprising a series of lower flight members being interconnected into an endless chain, each lower flight member having positioned thereon an upper flight member which is adapted to be moved transversely thereof, an upper die attached to the upper flight member and a lower die attached to the lower flight member, said dies being normally in superimposed alignment, said upper die being adapted to be moved transversely of the lower die and having seats therein for the upper portion of the capsules, means for removing the lower portions of the capsules from the upper portions as the latter rest upon their seats in the superimposed dies, means for positively moving the upper die with its upper portions of the capsules transversely of the lower die, means for feeding a substance into the lower die and its associated capsule portions, means for positively moving the upper die into alignment over the lower die, and means for lifting the filled lower portions of the capsules into engagement with the corresponding upper portions of the capsule so as to effect complete capsules having predetermined amounts of powdered substance therein.

4. Conveyor flights for a capsule filling machine, comprising a lower flight member having linkage connections at its ends, a lower die connected to a longitudinal edge of said lower flight member, an upper flight member positioned above the lower flight member and having means associating it with the lower flight member whereby it may move transversely with respect to the latter, and an upper die connected to a longitudinal edge of the upper flight member so that in a normal position of said flight members the dies are in direct alignment, whereas when the upper flight member is moved transversely to the lower flight member said dies are out of alignment.

5. Conveyor flights for a capsule filling machine, comprising a lower flight member having linkage connections at its ends, a lower die connected to a longitudinal edge of said lower flight member, an upper flight member positioned above the lower flight member and having means associating it with the lower flight member whereby it may move transversely with respect to the latter, said upper flight member being substantially triangular in shape and having a roller at its apex, and an upper die connected to a longitudinal edge of the upper flight member so that in a normal position of said flight members the dies are in direct alignment, whereas when the upper flight member is moved transversely to the lower flight member said dies are out of alignment.

6. In a device of the character described the combination of conveyor flights for a capsule filling machine, comprising a lower flight member having linkage connections at its ends, a lower die connected to a longitudinal edge of said lower flight member, an upper flight member positioned above the lower flight member and having means associating it with the lower flight member whereby it may move transversely with respect to the latter, said upper flight member being substantially triangular in shape and having a roller at its apex, and upper die connected to a longitudinal edge of an upper flight member so that in a normal position of said flight members the dies are in direct alignment, whereas when the upper flight member is moved transversely to the lower flight member said dies are out of alignment, and a cam engaging the roller on the upper flight member for moving the latter transversely.

7. Conveyor flights for a capsule filling machine, comprising upper and lower flight members, having dies attached to one of their corresponding longitudinal edges so that the dies are normally in direct alignment, the upper die having a series of apertured seats to receive and retain the upper portions of capsules, the lower die having a corresponding series of apertures for the reception of lower portions of capsules, the series of apertures in the lower die having a longitudinal cut extending therethrough.

8. Conveyor flights for a capsule filling machine, comprising a lower flight member and an upper flight member adapted to be moved transversely of the lower flight member, a pair of dies attached to corresponding longitudinal edges of the flight members so that the dies are normally in direct alignment, but when the upper flight member is moved transversely to the lower flight member said dies are out of alignment, the upper die containing a series of apertures which have seats adjacent their ends so as to receive and retain the upper portions of capsules, the lower die having an analogous number of apertures which are normally in alignment with the apertures of the upper die, the apertures of the lower die having a longitudinal cut extended therethrough.

9. In a capsule filling machine, the combination of an endless power driven conveyor having upper and lower normally aligned dies for the reception of capsules, the upper die supporting upper portions of capsules, an adjustable bar positioned beneath the lower die so as to support the lower portions of the capsules within the lower die when they are separated from their upper portions and means for adjusting the bar so as to vary the distance of separation between the upper and lower portions of the capsules.

10. In a capsule filling machine, the combination of an endless power driven conveyor having upper and lower normally aligned dies for the reception of capsules, the lower die having a longitudinal cut extended therethrough, a suction chamber positioned directly beneath the lower die and having a portion of said chamber extending into the longitudinal cut for sealing engagement therewith, an adjustable bar extending into the suction chamber and positioned beneath the lower die so as to support the lower portions of the capsules therein when they are separated from their upper portions of the upper die, means for adjusting said bar including rack and pinion mechanism.

11. In a capsule filling machine, the combination of an endless power driven conveyor having upper and lower normally aligned dies for the reception of capsules, the lower die having a longitudinal cut extended therethrough, a suction chamber positioned directly beneath the lower die and having a portion of said chamber extending into the longitudinal cut for sealing engagement therewith, one side of said chamber having a slot to receive an adjustable bar extending into the suction chamber and being positioned beneath the lower die, and means to seal the suction reservoir at the entrance of the bar through the slot against the atmosphere, said bar supporting the lower portions of the capsules within the lower die when they are separated from their upper portions of the capsules within the upper die, means for adjusting said bar including rack and pinion mechanism.

12. In a device of the character described the combination of conveyor flights for a capsule filling machine supporting upper and lower normally aligned dies, the lower die having a longitudinal cut extended therethrough, the wide head portions of capsules being supported in the upper die and the narrower lower portions of the capsules being separately supported in the lower die, an inclined cam having a portion thereof extending into the longitudinal cut of the lower die so as to lift the lower portions of the capsules upwardly into the head portions of the capsules as the dies pass over the cam.

13. In a device of the character described the combination of conveyor flights for a capsule filling machine supporting upper and lower normally aligned dies, the lower die having a longitudinal cut extended therethrough, the head portions of capsules being supported in the upper die and the lower portions of capsules being separately supported in the lower die, an inclined cam having a portion thereof extending into the longitudinal cut so as to lift the lower portions of the capsules upwardly into the head portions of the capsules as the dies pass over the cam, and means for adjusting the camming means both longitudinally and vertically.

14. A power driven conveyor for a capsule filling machine comprising a series of lower flight members being interconnected into an endless chain, each lower flight member having positioned thereon an upper flight member which is adapted to be moved transversely thereof, an upper die attached to the upper flight member and a lower die attached to the lower flight member, the upper die being apertured and seated to support the upper portions of capsules, the lower die being apertured to receive the lower portions of capsules, an adjustable substantially horizontal bar extending approximately the full length of the conveyor, said bar being positioned directly below the lower dies to act as a guide support for the lower capsule portions, and means for varying the distance of the bar from the lower dies so as to control the distance of separation of the upper and lower portions of the capsules within their dies.

STEPHEN J. SPECKHART.
RUDOLPH HERGER.